United States Patent
Clark et al.

(10) Patent No.: US 10,977,818 B2
(45) Date of Patent: Apr. 13, 2021

(54) MACHINE LEARNING BASED MODEL LOCALIZATION SYSTEM

(71) Applicant: Manor Financial, Inc., Herndon, VA (US)

(72) Inventors: Taylor Clark, Kansas City, KS (US); Andrew Kemendo, Cheverly, MD (US); Mark Shanks, Baltimore, MD (US)

(73) Assignee: Manor Financial, Inc., Herndon, VA (US)

( * ) Notice: Subject to any disclaimer, the term of this patent is extended or adjusted under 35 U.S.C. 154(b) by 57 days.

(21) Appl. No.: 15/904,273

(22) Filed: Feb. 23, 2018

(65) Prior Publication Data

US 2018/0189974 A1    Jul. 5, 2018

Related U.S. Application Data

(60) Provisional application No. 62/508,446, filed on May 19, 2017.

(51) Int. Cl.
*G06T 7/70* (2017.01)
*G06N 3/08* (2006.01)
(Continued)

(52) U.S. Cl.
CPC ............ *G06T 7/70* (2017.01); *G06N 3/04* (2013.01); *G06N 3/08* (2013.01); *G06T 7/50* (2017.01);
(Continued)

(58) Field of Classification Search
USPC ........ 358/103, 100, 155–159, 181, 189–190, 358/205, 276, 285
See application file for complete search history.

(56) References Cited

U.S. PATENT DOCUMENTS

| 6,411,327 B1 * | 6/2002 | Kweon | G02B 5/04 |
| | | | 348/49 |
| 9,119,559 B2 * | 9/2015 | Collins | A61B 8/0891 |

(Continued)

OTHER PUBLICATIONS

Saxena, et al., "Make3D: Learning 3D Scene Structure from a Single Still Image", IEEE Transactions on Pattern Analysis and Machine Intelligence, vol. 31, Issue 5, May 2009, 66 pages.

*Primary Examiner* — Dwayne D Bost
*Assistant Examiner* — Stephen M Brinich
(74) *Attorney, Agent, or Firm* — Nixon & Vanderhye PC

(57) ABSTRACT

A method for deriving an image sensor's 3D pose estimate from a 2D scene image input includes at least one Machine Learning algorithm trained a priori to generate a 3D depth map estimate from the 2D image input, which is used in conjunction with physical attributes of the source imaging device to make an accurate estimate of the imaging device 3D location and orientation relative to the 3D content of the imaged scene. The system may optionally employ additional Machine Learning algorithms to recognize objects within the scene to further infer contextual information about the scene, such as the image sensor pose estimate relative to the floor plane or the gravity vector. The resultant refined imaging device localization data can be applied to static (picture) or dynamic (video), 2D or 3D images, and is useful in many applications, most specifically for the purposes of improving the realism and accuracy of primarily static, but also dynamic Augmented Reality (AR) applications.

20 Claims, 7 Drawing Sheets

(51) Int. Cl.
  *G06T 7/50* (2017.01)
  *G06N 3/04* (2006.01)
  *G06T 7/536* (2017.01)
  *G06T 7/77* (2017.01)

(52) U.S. Cl.
  CPC ............... *G06T 7/536* (2017.01); *G06T 7/77* (2017.01); *G06T 2207/20081* (2013.01); *G06T 2207/20084* (2013.01); *G06T 2207/30244* (2013.01)

(56) References Cited

U.S. PATENT DOCUMENTS

| | | | |
|---|---|---|---|
| 9,148,650 B2* | 9/2015 | Chandraker | H04N 13/204 |
| 2009/0110267 A1* | 4/2009 | Zakhor | G06T 15/04 |
| | | | 382/154 |
| 2011/0124410 A1* | 5/2011 | Mao | A63F 13/212 |
| | | | 463/31 |
| 2014/0286536 A1* | 9/2014 | Pettersson | G01C 15/002 |
| | | | 382/106 |
| 2015/0077520 A1* | 3/2015 | Ohba | A63F 13/213 |
| | | | 348/47 |
| 2017/0275023 A1* | 9/2017 | Harris | H04N 13/239 |
| 2018/0176483 A1* | 6/2018 | Knorr | G06T 19/006 |

* cited by examiner

MACHINE LEARNING BASED MODEL LOCALIZATION SYSTEM

CROSS REFERENCE TO RELATED APPLICATIONS

This application claims priority from U.S. Provisional Application No. 62/508,446 filed May 19, 2017, entitled "ARTIFICIAL NEURAL NETWORK BASED MODELING & LOCALIZATION SYSTEM." The content of the aforementioned application is hereby expressly incorporated by reference into the present application in its entirety.

FIELD OF THE INVENTION

The invention relates generally to a method for localizing and globally orienting an imaging device (e.g. a camera) in an observed environment based on analysis conducted by a trainable automated system on at least one 2-Dimensional image of a scene within the subject environment.

BACKGROUND OF THE INVENTION

Augmented Reality (AR) is a mode of Human Computer Interaction in which virtual content is overlaid onto a user's visual perception of their local environment such that the virtual content appears to be physically present in a given scene. The overlay may occur on static images in an offline mode, or to video images in real-time or non-real-time modes. A number of electronic displays may be employed to facilitate the presentation of such AR content to a user, such as: mobile or large-format flat panel displays (e.g. LCD, OLED, etc.), head mounted displays (e.g. near-eye microdisplays, waveguide relay displays, semi-reflective displays, virtual retinal displays, etc.), or projection displays.

In the first implementations, AR systems employed optical markers—high contrast 2-dimensional printed images—to query a local or remote database and retrieve virtual content that was to be overlaid on a user's view of a real scene, whether viewed indirectly through a desktop display or directly through head-mounted video or optical see-through displays. In a marker-based configuration, a camera records an image of the scene in which the marker is present, computer vision algorithms search for the marker pattern in the observed image and identify the key features of the marker image. The identification of a marker may be used to automatically query a database to retrieve a corresponding file containing virtual content to be overlaid, such as 2D or 3D static or animated model(s). The spatial transform of the marker to inform the system about the spatial depth (scale and z-axis location), orientation (rotation), and lateral/vertical position (x- and y-axis location); effectively yielding a camera pose estimate. The virtual content is then presented to the user to complete the illusion that the virtual model content is truly present in the user's local environment. However, physical markers must be printed, which is cumbersome. Additionally, for static images, markers must be placed in a scene prior to capturing an image and the marker position & orientation cannot be altered after image capture.

Advancements in real-time Computer Vision image feature mapping have enabled modern AR applications to perform real-time "markerless" tracking of a scene and an associated virtual content overlays; in a sense, the scene becomes the marker. However, for a scene to serve as a marker, the Imaging systems used for markerless AR and other applications that require understanding of a scene's 3D content have employed many combinations of a variety of sensors to ascertain the camera's 3D position and orientation vector (i.e. pose estimate) relative to an observed scene from which accurate virtual object overlays can be referenced. 3D sensors have proven costly, bulky, and complex. In lieu of direct 3D scene measurement, 3D content may be derived from a plurality of 3D images using Structure from Motion (SFM) algorithms. Such software has proven computationally expensive. In either case, applications using such 3D scene content generally require additional software to understand the local and global context of that pose estimate, such as but not limited to, the height above a detected floor plane or orientation relative to the Earth's gravitational vector.

No prior art has demonstrated the ability to generate 3D scene map with a contextually refined image sensor pose estimate from a single 2D image, which is critical to practical static image-based AR applications and can be applied to simplify video-based AR applications. Herein, the terms "map" and "image" are used interchangeably.

For example, U.S. Pat. No. 6,411,327 discloses a typical modern stereoscopic camera system for generating a 3D scene map directly, through which an accurate and contextual pose estimate could be derived from additional post-image processing. However, the disclosed system, typical of all stereoscopic imaging systems, requires complex optics and the computationally intensive transmission and correlation of a stereoscopic image pair. The method is reliant on a stereo-image pair and thus cannot be used to derive a pose estimate from a 2D image.

U.S. Patent Application No. 2009/0110267 demonstrates the typical mapping a 3D scene from which the image sensor pose estimate can be derived directly through the use of a Light Detection and Ranging (LIDAR) imaging system. LIDAR belongs to a class of imaging systems that emit a typically electromagnetic wave and then measure changes to the spatial or temporal properties of the wave following the reflection off of objects within a scene to discern the topography of the scene. While this class of device inherently provides a direct and sometimes accurate imaging device pose estimates, the hardware is generally expensive, bulky, and power intensive, and therefore are not practical for mobile device applications. Additionally, the resultant metadata describing a scene's 3D and camera pose can drive file sizes to be relatively large, taxing data storage or network transmission resources.

Users typically capture static images and dynamic video without the intent of using this data for AR applications, and as a result there are numerous image and video files available that lack the requisite 3D scene metadata needed for realistic dynamic overlay of AR content integration into the image. Thus, reliance on 3D imaging device-based pose estimates (i.e. sensors that encode pose measurement data into the image file) also precludes the derivation of pose estimates from images captured on standard 2D camera systems.

In the past decade, mobile devices (e.g., phones, tablets, Head Mounted Displays (HMDs), etc.) with integrated cameras have emerged, and often also often include processors running algorithms that automate the scene depth modeling and refinement process. However, most mobile devices use monocular cameras, and thus the vast majority of image content captured by users is limited to 2D.

U.S. Pat. Nos. 9,119,559 and 9,148,650 both disclose unique embodiments of SFM technology, which maps a 3D image from a plurality of 2D images. Similar technology is exhibited in commercially available software such as Autodesk 123d Catch®. In dynamic (i.e. video input) applications the technique is often referred to as Simultaneous Localization and Mapping (SLAM) algorithms. The technique employs the process of correlating a set of 2 or more static images of an observed scene to build a 3D map of the environment from which a camera pose estimate is derived. However, this method requires complex computer vision software operating on multiple 2D images, generally taken from a video stream or requiring the user to capture a sequence of individual static images from sufficiently different perspectives while ensuring the scene content remains largely static. Thus, the method is computationally expensive, sometimes labor intensive, and the generation of a 3D map or derivation of the camera pose estimate from a single image is not achievable using such methods.

Techniques have emerged which employ Machine Learning constructs and algorithms, such as Markov Random Fields (MRFs), or Artificial Neural Networks (ANNs), commonly Convolutional Neural Networks (CNNs), or combinations thereof, trained on scene images with corresponding high accuracy depth maps to generate estimated depth maps from a single 2D image input. In the present invention, a CNN is employed, but any machine learning algorithm capable of being trained to estimate depth of a scene based on 2D images may be employed. As described in "Make3D: Learning 3D Scene Structure from a Single Still Image" A. Saxena, et al., IEEE Transactions on Pattern Analysis and Machine Intelligence (Volume: 31, Issue: 5, May 2009), image sets may be used in a supervised or unsupervised manner to train an ML system (an MRF in this instance), to detect depth of points in a 2D image. In an analogous CNN implementation, the CNN generates depth by rapidly and inherently analyzing subtle depth cues present in an image which may not be apparent to the human observer, such as relative degree of focus, texture variations, lighting effects, as well as other likely depth cues typically present in 2D images which the CNN has learned during training, but which have not been characterized by humans. While a 3D map is generated, the method for inferring a contextually refined image sensor pose estimate, a property critical to the realistic representation of the physical interaction between virtual objects and the real scene content, is not disclosed in prior art.

SUMMARY OF THE INVENTION AND ADVANTAGES

Embodiments of the present invention are directed to devices, methods and systems for facilitating AR applications, particularly those applied to static images, although other applications such as embedded firmware in augmented reality or wearable devices for real-time contextually refined localization and orientation of a user within an environment, are possible. In accordance with the present invention, the deficiencies of prior imaging device localization systems have been overcome.

Following the construction of a depth map, to realize a map's utility for AR applications it becomes necessary to localize and orient the original imaging device relative to the observed scene. This pose estimation provides the image view perspective, such that when a non-native virtual object is overlaid (in the case of a simple 2D image overlay, herein, "image") or embedded (in the case of a 3D model insertion, herein "model"), the inserted virtual object is subjected to image transformations associated with the physical characteristics of the original imaged scene, which yield composite images having realistic depth cues from the viewer's perspective.

One characteristic realism and depth cue that may be matched between the original scene and an inserted virtual object includes scale. If the image device location is accurately determined relative to a depth map of a given scene, then the apparent scale of recognized 3D content from the original real scene is also accurately deterministic, which permits a virtual object image/model to be placed in the scene at the appropriate scale and perspective relative to the viewer. For example, if the virtual object is intended to be placed "deeper" in the scene, it's size will be increasingly small relative to the view window. Further, lateral movement of a virtual object can be coupled with an appropriately scaled virtual object rotation vector dependent on the intended depth of the virtual object in the image scene. A highly accurate camera localization determination will yield an accurate matching of the inserted object scale, such that the size and orientation of the object appears as it would if it were a native object in the real scene. Critically, the pose estimate may be coupled with semantic contextual data gathered through the segmentation and recognition of specific objects in a scene such as the 3D location and orientation vector of an identified floor plane object.

The CNN in the loop serves as a significantly faster and more accurate proxy to human 2D image depth and object segmentation/classification analysis (to include scene space boundaries such as floor and wall planes) as well as non-Machine Learning Computer Vision techniques. Moreover, the CNN can be continually and rapidly trained for continually increasing performance, to the benefit of a massive number of end users who obtain and employ copies of a revised CNN or have parallel access to a continually updated CNN via processing capabilities over a network. Contrarily, a human who is increasingly trained to analyze a 2D image for depth/object recognition serves to benefit only 1 or a limited number of end users.

Maps created by multiple imaging devices from multiple perspectives is useful. Segmentation and classification algorithms may be used, such that in this example, the observed chair is recognized in general to be a chair and if a model or attributes describing a similar chair are available then that data can be used to provide some degree of hidden information such as knowledge that the chair has a discrete "back" and does not extend to infinity.

Through the application of object detection CNN, the present invention is capable of revealing hidden scene information by using the associated semantic context of recognized objects. Hidden information in an environment is particularly useful for AR systems supporting simulated physical interactions between virtual and real content within a scene, such as simulated physics (gravity and collisions), occlusion and illumination effects. For example, an observed and recognized chair object is recognized in general to possess the general properties of a matched chair object record and such semantic contextual data can be used to provide some degree of hidden information such as knowledge that the chair has a discrete "back" and does not extend to infinity, or improving the refinement of a floor plane with the understanding that a chair's segmented feet generally sit flat on the floor plane. This process can be implemented using object recognition of any type upon which a Machine Learning algorithm is trained.

In the most general form, the present invention comprises a system capable of accepting at least one 2D image of a scene as an input, using a depth image-trained Machine Learning algorithm (a CNN in the preferred embodiment), to efficiently reconstruct a 3D (depth) map of the scene relative to the imaging device, and further deriving a proportionately accurate 3D position and orientation of the source imaging device relative to the scene. One or more additional object recognition-trained Machine Learning algorithms may be employed to detect objects that provide additional semantic context to the derived pose estimate. For example, such contextual information can aid in discerning whether or not the imaging device was not level with respect to the Earth's gravitational vector. As an additional example, contextual information can further aid in discerning if a detected floor plane is truly not orthogonal to the Earth's gravitational vector. Compared to the state of the art, the present invention offers a computationally efficient, inexpensive and accurate method of reconstructing a 3D map of a scene with contextually refined imaging device pose estimate, from a static 2D image.

BRIEF DESCRIPTION OF THE DRAWINGS

The enclosed figures, accompanied by the following detailed description serve to improve understanding of exemplary and preferred embodiments of the present invention, wherein.

DETAILED DESCRIPTION OF THE PREFERRED EMBODIMENT

A method and exemplary implementation system for generating an accurate 3D pose estimate of a source image sensor relative to 3D objects in an observed scene, based on a 2D source image input, is described. Referring to the figures, like numerals indicate like or corresponding parts throughout several views. Many specific details are set forth in order to provide a thorough understanding of the embodiments described herein, but it is understood by those of ordinary skill in the art that the embodiments described herein may be practiced without these specific details. Further, in other instances, well-known optional features (i.e. methods, procedures and components) have not been described in detail so as not to obscure the embodiments described herein, but it is understood by those of ordinary skill in the art that such optional features may be practiced in conjunction with the disclosed invention. The description is not to be considered as limiting the scope of the embodiments described herein.

Figure 1:
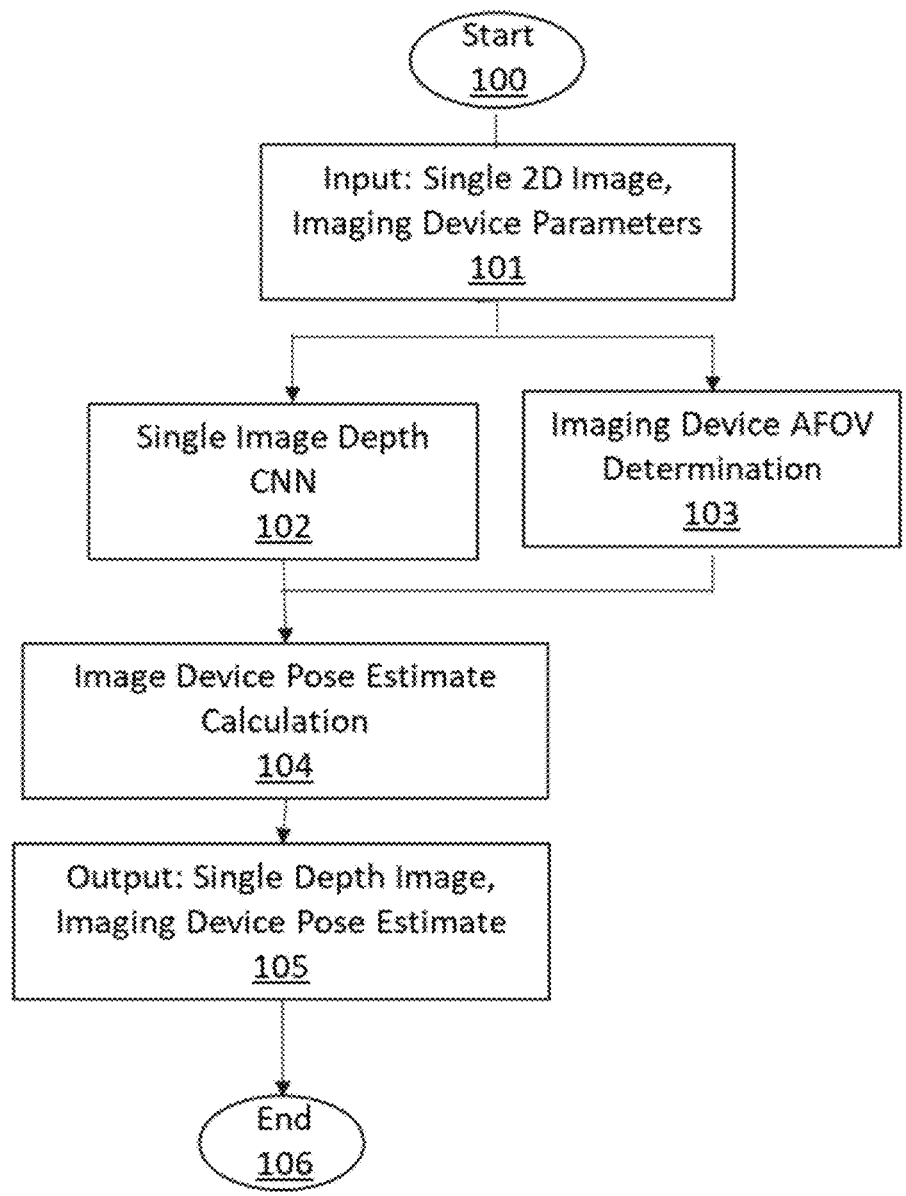
FIG. 1 is a simplified flow diagram depicting the exemplary basic elements of the invention to include the 2D image input from an imaging device with known focal length, the processing of that image through a CNN trained to estimate scene depth information from a 2D image input, additional processing of the depth map to derive the image device 3D pose estimate vector, and the 3D depth map and imaging device pose estimate output.

Referring to FIG. 1, the fundamental process of the disclosed method is depicted. At its inception 100, the process requires an implementing data processing system to include a means of receiving image sensor input data 101. The data may be transmitted to the data processing system, for example, as a stored file on storage media or data feed. In one embodiment, the input data may be captured directly by a 2-Dimensional imaging device, such as, but not limited to, standard cameras commonly integrated in mobile cellular phones and tablets such as Charge-Coupled Device (CCD) cameras.

The Image input may also be derived indirectly, for example, from digital video screen captures, single image video file frame extractions, or scanned analog photographs. The input data, 101, must include data defining the source imaging device parameters such that the imaging devices Angular Field of View (AFOV), 103, is either known or determinable. For rectangular image form factors, the AFOV is typically given in vertical and horizontal degrees relative to the center of the imaging device lens, although other form factors such as circular frame images are possible. In a circular image, AFOV may be given in terms of a single angle relative to the center of the imaging device lens.

Alternatively, the system must include a means of deriving or otherwise estimating the imaging device parameters to ascertain the AFOV. For example, for a CCD-based camera, the focal length of said camera along with the horizontal dimension of the image sensor chip is sufficient to compute the AFOV. As an alternative example, if the type of commercially available camera used to produce the subject image is known, the system can use a look-up table to determine all or a portion of the necessary camera parameters from manufacturer data. In yet another embodiment, the system employs a secondary machine learning algorithm (not shown) trained to estimate camera AFOV from an input images.

The Single Image Depth CNN (i.e. 'Depth-CNN'), 102, is a CNN that has been trained on the correlations between 2D images of scenes and high-accuracy 3D models (e.g. scans) of said scene, such that the resultant CNN is capable of estimating depth of at least part of a 2D image input. A CNN is depicted, however, any machine learning algorithm which can be trained to estimate the pixel depth from a 2D image input may be employed at step 102. In parallel to the AFOC computation, the Depth-CNN receives the 2D image of 101 as input and estimates the most probable depth of at least a portion of, and preferably all, points (represented by image pixels) comprising the observed scene of the input 2D image, relative to the center of the imaging device lens.

Using a depth estimate of an arbitrary point in the observed scene and the AFOV indicator of the source imaging device, the Camera Pose Estimate Calculation, 104, can be executed. The pose estimate is then available for output, 105, by the implementing system in conjunction with the CNN-generated image depth map to conclude the process. The pose estimate and depth map may be output as separate files on separate media or in the same file and media (e.g. as a depth image file with metadata identifying the image sensor pose estimate).

Figure 2:
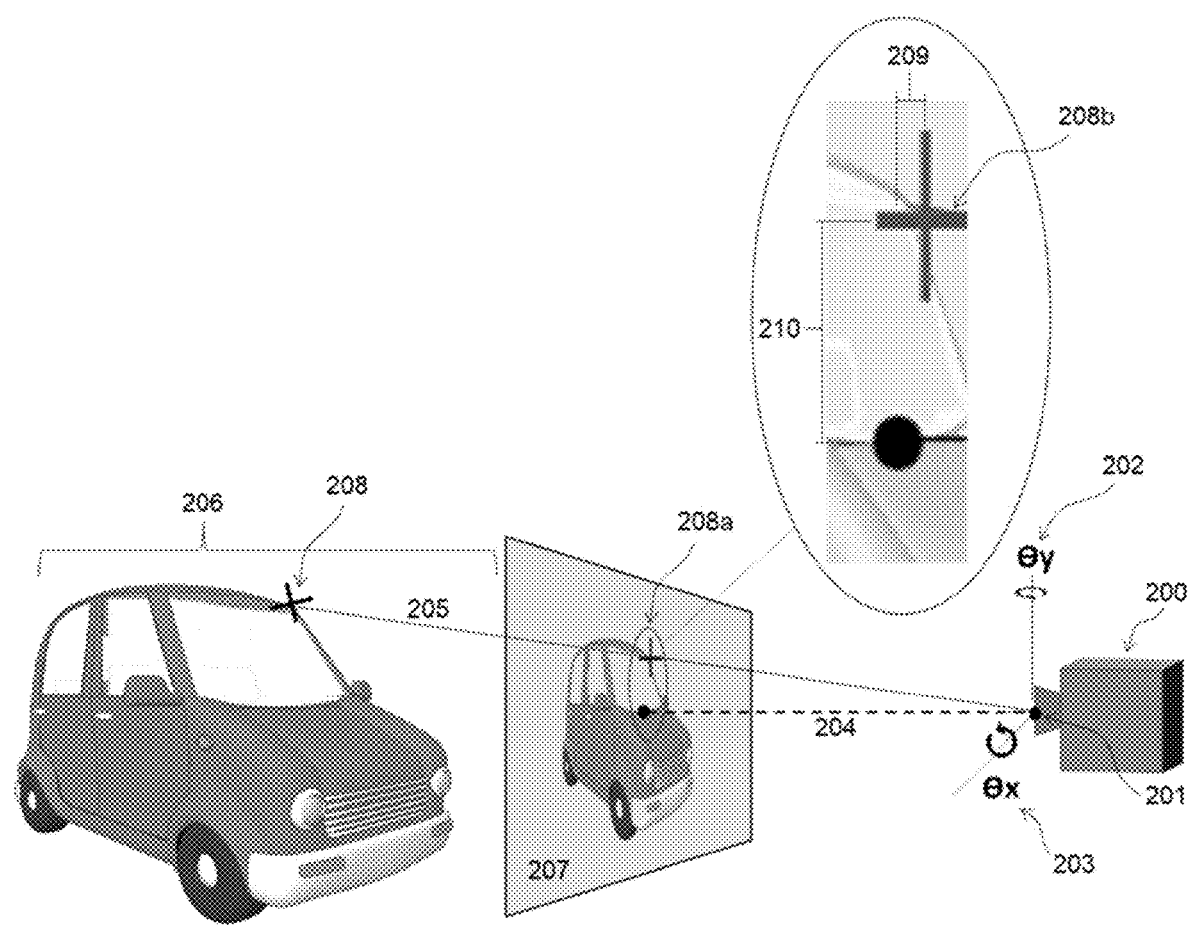
FIG. 2 depicts the geometries associated with the Machine Learning-based image sensor 3D pose estimation process.

As depicted in FIG. 2, any arbitrary real object point, e.g. 208, represented as a pixel 208a and b in a 2D image 207 of the observed scene 206, for which a depth estimate 205 has been determined, may be used to generate a pose estimate of the source image device, 200. For the purposes of reverse engineering the pose estimate, the input 2D image of 101 is modeled as the virtual image plane, 207, projected between the imaging device 200 and real scene 206. The scale of focal distance 204, between the lens and the virtual image plane, 207, is exaggerated in the figures for clarity. The pose estimate is a multi-dimensional vector that provides, at a minimum, the distance (d), 205, and orientation angle ($\theta_x$, 203, and $\theta_y$, 202) of the imaging device. In the exemplary figure, for simplicity, the imaging device pose is ultimately referenced from the center of the imaging device's lens, 201, in 3D space relative to all real 3D points in the observed scene, 206. This point is generally located at a focal distance (f) along the optical axis, 204, in front of the center of the imaging system image sensor (e.g. CCD chip in digital cameras or film in analog cameras). Any arbitrary point may be used to establish the reference coordinate system for the pose estimate by applying the appropriate distance offsets.

The method described uses a spherical coordinate system for simplicity, although other coordinate systems may be used. The optical axis of the image device, 204, passes orthogonally through both the center of the image sensor lens 201 and the central pixel of the virtual image 207. Thus, assuming the quality of the depth estimate from 102 for the central image pixel is determined to be of satisfactory quality, the basic pose estimate is determined simply as distance (d), 205, derived from the CCN-generated depth map, and orientation angles ($\theta_x$ and $\theta_y$), 203 and 202 which are equal to zero (i.e. aligned with the optical axis). The resultant basic pose estimate, $P_B$, may be conveyed, for example, in vector format: $P_B = \langle 205, 203, 202 \rangle (=) d, \theta_x, \theta_y \rangle$.

In one embodiment, the vertical (y) and horizontal (x) dimensions of the imaging device sensor along with the device focal distance are provided such the x and y offset distance of any pixel in the image sensor plane, and thus virtual image plane, is determinate. In conjunction with the input focal distance, the angular position of a subject pixel may be determined. Therefore, as an alternative to using the central image pixel, any arbitrary pixel in the image may also be used to generate a pose estimate vector's components by applying trigonometry to the imaging device parameters as follows:

d=the input depth estimate $\theta_x = -(\sin^{-1}(y/f))$, relative to optical axis 204;

$\theta_y = -(\sin^{-1}(x/f))$, relative to optical axis 204;

In a second embodiment, the angular vertical and horizontal FOV limits are provided, from which the focal distance can be derived to generate the image pixel angle components by again applying trigonometry.

The basic pose estimate, coupled with a depth map of the observed scene provides a rudimentary 3D environment with which virtual objects can be overlaid for AR applications. However, users often capture images that are not parallel to the ground, so inferring an understanding of the context of objects within an observed scene image. This contextual refinement to the pose estimate becomes useful, for example in the case of ground plane object identification, to realistic embedding of virtual objects because the ground plane often serves as the plane upon which virtual objects are translated. Additionally, in many AR applications that attempt to overlay virtual objects in a scene that appear and behave like real objects in the target scene, it is necessary for the system to have data identifying the ground plane location and orientation in relation to the imaging device. By default, knowledge of object points in the scene which do not align with the floor plane identify all non-floor plane objects, which may be used by an AR application such as an occlusion and/or collision mask to simulate interactions between real scene objects and virtual objects such as visual occlusion or physical collisions.

Figure 3:
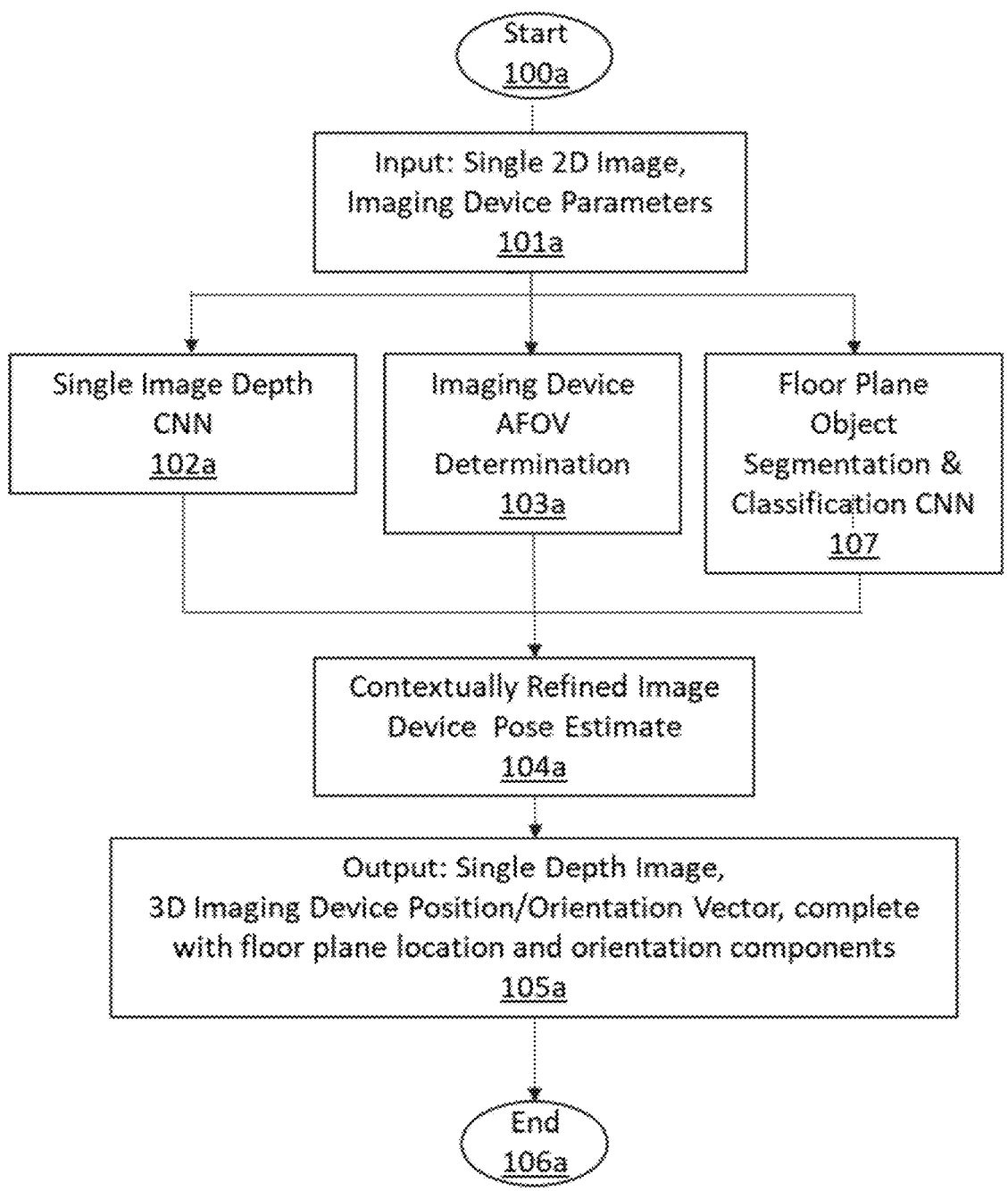
FIG. 3 is a simplified flow diagram depicting the exemplary elements of the invention extended to include the application of an additional CNN trained to facilitate object detection (segmentation and classification), specifically a floor plane object, to support a contextually refined image sensor pose estimate.

FIG. 3 depicts a second embodiment, which employs the same inputs and steps described in FIG. 1, with the exception that an Object Segmentation & Classification Machine Learning algorithm, 107, which has been specifically trained to recognize a floor object in a 2D scene image, is executed concurrently with the standard scene depth-sensing CNN, 102a, and the Imaging Device AFOV determination steps, 103a. In the exemplary flow diagram depicted, a trained CNN is the Machine Learning algorithm applied in step 107. The outputs of steps 102a, 103a, and 107 and used in step 104a to calculate a contextually refined pose estimate for the imaging device. The pose estimate is output 105a in conjunction with the CNN-generated 3D map of the image to complete the process, 106a.

Figure 4:
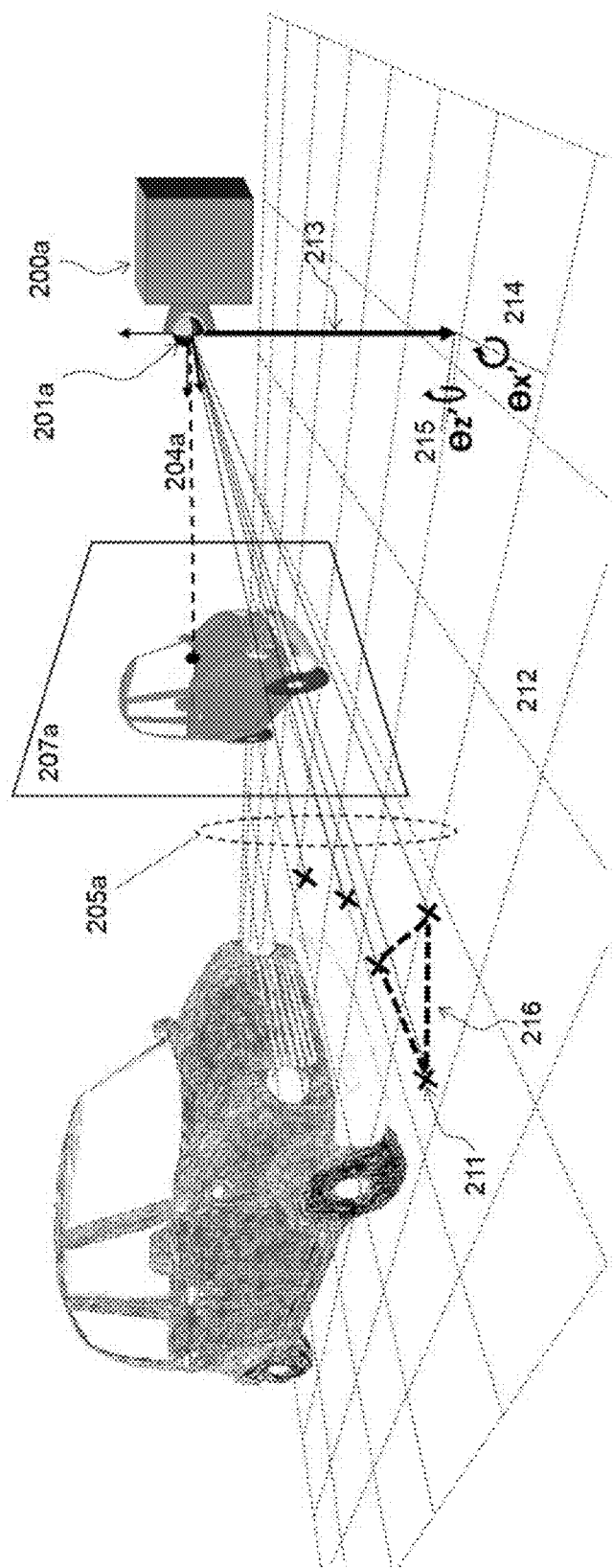
FIG. 4 depicts the geometries associated with the Machine Learning-based image sensor 3D pose estimation process with floor plane detection.

FIG. 4 depicts the geometry associated with the second embodiment outlined in the process of FIG. 3. Specifically, the imaging device, 200a, has a first basic pose estimate relative to all scene objects is determined using the outputs of steps 102a and 103a based on the input image 207a and image device parameter inputs 101a, respectively, as outlined in the description of FIG. 2. At this stage, the pose estimate lacks semantic context. Concurrently, step 107 is applied to the image 207a, to segment and classify image pixels that the CNN of step 107 has been trained for recognize as being part of a "floor plane" object, 212. Once recognized, step 104a may apply the depth estimates for three or more pixels (e.g. 211) selected from a sampling of pixel depth estimates, 205a, comprising the floor object, as determined in step 102a. Pixels having greater spatial disparity have a higher likelihood of generating an accurate floor plane location and orientation vector. For, example, assuming only three points are used for floor plane identification, a triangular patch 216 is formed that represents the floor plane orientation. Step 104a uses basic trigonometry to calculate the orientation angles ($\theta_{x1}$, 214, and $\theta_{Z1}$, 215) relative to the imaging device reference point axes, 201a. If more than three points are used to increase fidelity, and the resulting points do not lie perfectly in a plane, then nearest plane found using a matching function may be employed to identify the highest probable floor plane 212. The exemplary system is designed to assume the detected floor plane is continuous, flat and extends to intersect with the vertical (y) axis of the imaging device reference point axes, 201a. The length of the resultant ray 213 defines the estimated height of the camera above the floor plane.

Assumptions associated with the definition of the floor plane object may be made. For example, in the preferred embodiment, the floor plane is defined such that the plane extends to infinity. Other system definitions for a floor plane object may include, but are not limited to, the plane being orthogonal to the vector of the Earth's gravitational acceleration. The assumption that the plane extends to infinity is an example of how semantic contextual data may be leveraged to reveal hidden information in a scene based on prior or learned knowledge.

The resultant contextual data describing the floor plane may be encoded with the base image sensor pose estimate into a composite contextually refined pose estimate, $P_1$, in the form of a higher-dimensioned vector (e.g. a 6-Dimension vector) such that $P_1 = \langle 205, 203, 202, 213, 214, 215 \langle = \langle d, \theta_x, \theta_y, d, \theta_{x1}, \theta_{y1} \langle$. The subscript "1" is used to annotate vector components providing contextual information derived from a first recognized object (i.e. the floor plane object).

Figure 5:
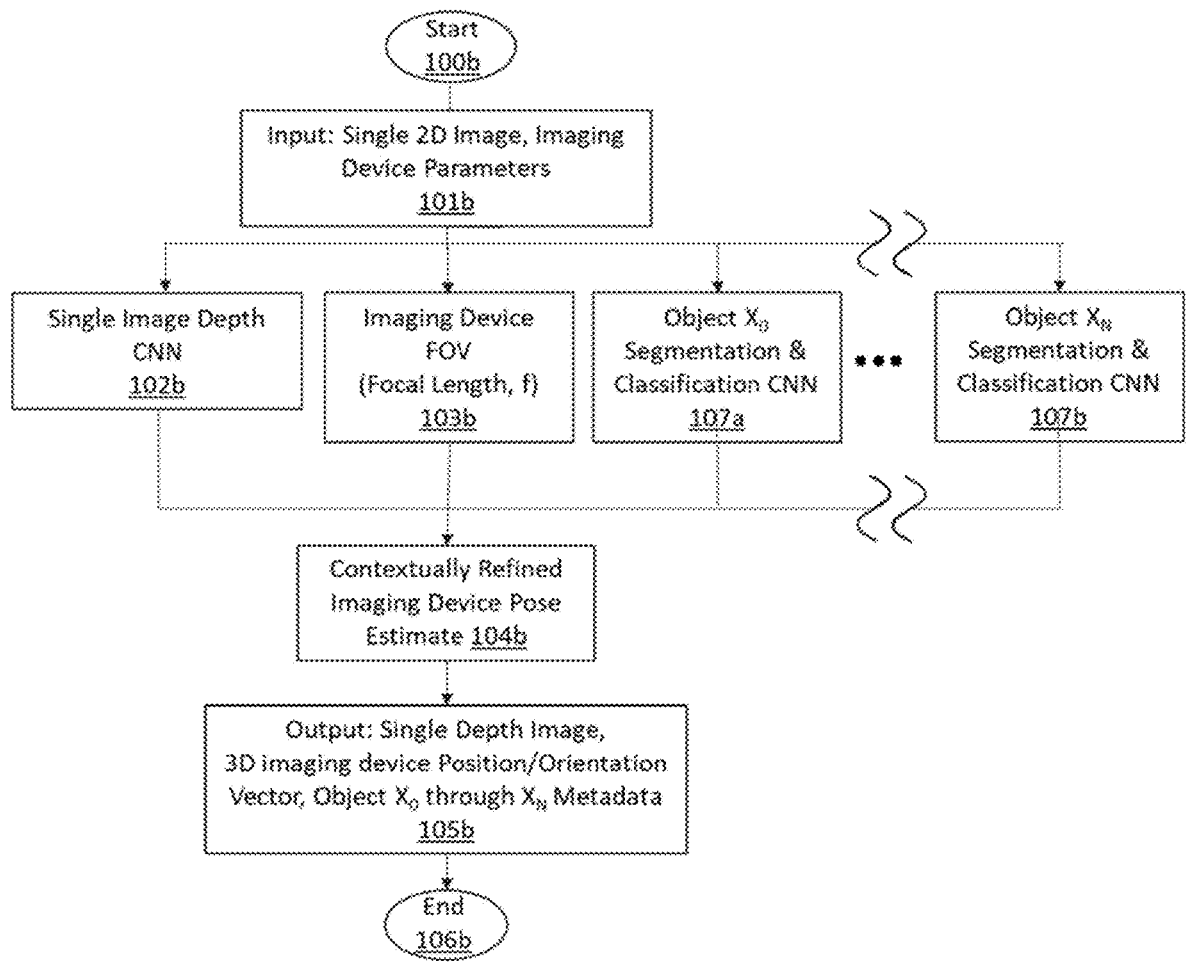
FIG. 5 is a generalized flow diagram of the invention extended to include the application of an arbitrary number of object detection CNNs to support further contextual refinement of the image sensor pose estimate.

As depicted in FIG. 5, the process described in FIG. 3 may be extended to include an arbitrary number, N, of trained Object Segmentation and Classification machine learning algorithms. The flow diagram of FIG. 5 includes all of the steps of FIG. 3, with the exception that a set containing an arbitrary number of Object Segmentation & Classification Machine Learning algorithms arranged in parallel with steps 102b and 103b, beginning with a first object detection step 107a and ending with a final $N^{th}$ step, 107b. Each object detection step within the set having been trained to detect an object within a 2D input image, 101.b. Similar to the process of step 104a in FIG. 3, in which the location and orientation of the detected floor plane relative to the imaging sensor is determined via simple trigonometry applied to three or more candidate object points in the image, the location and orientation of other detected objects of FIG. 5, may be determined in this manner as well. Depending on the complexity of the detected objects geometry, more or fewer points may be needed to yield an accurate pose estimate vector.

The resultant contextual data included in the output, 105b, describing the imaging sensor pose estimate with respect a scene and an arbitrary number of detected objects may be encoded with the base image sensor pose estimate into a composite contextually refined pose estimate, $P_N$, in the form of a higher-dimensioned vector having the generalized form: $P_N = \langle d, \theta_x, \theta_y, d, \theta_{x1}, \theta_{z1}, \ldots, d_{N-1}, \theta_{xN-1}, \theta_{yN-1}, d_N, \theta_{xN}, \theta_{yN} \rangle$. The subscript "N" refers to the number of object detection algorithms employed in the system. The number of vector components associated may be as few or as many as necessary, and may use a single or hybrid coordinate system, to provide sufficient detail needed to accurately encode the location and orientation of the object in the imaging device pose estimate. Further, an image processed using a method embodiment with multiple object detection algorithms may not locate some objects for which CNN's have been trained to identify. In this instance, vectors may still be encoded to maintain data structure, but with a null value for each component associated with the undetected object.

Figure 6A:
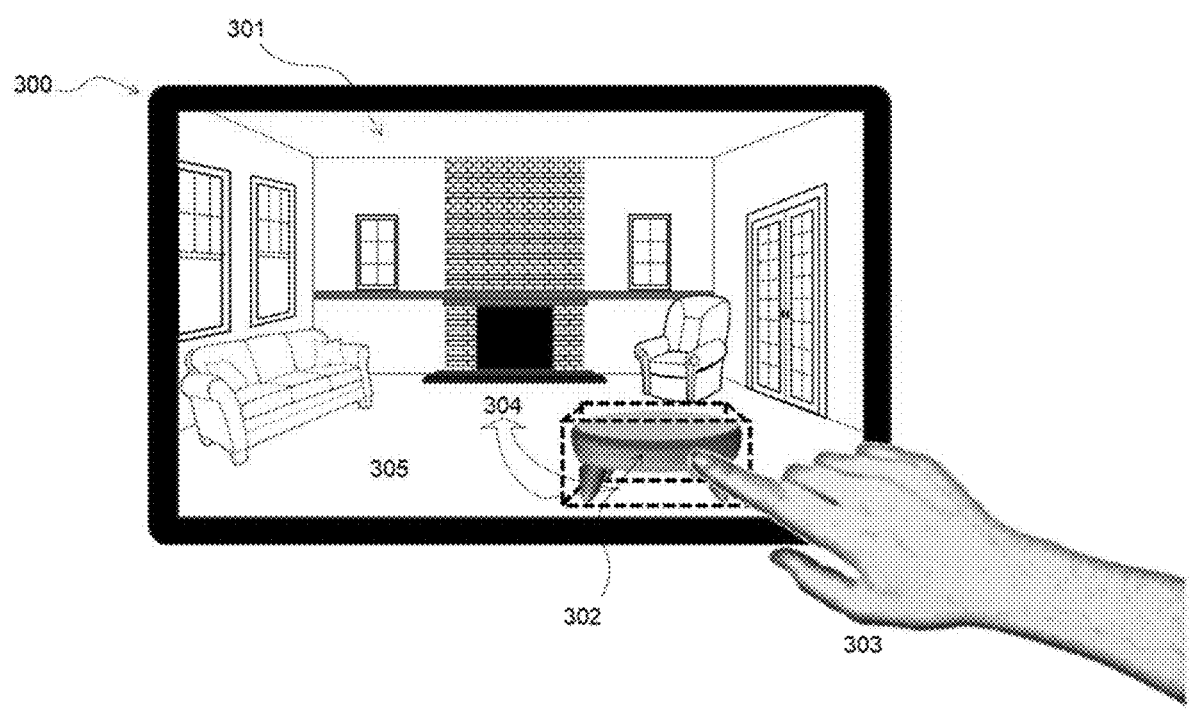
FIG. 6A depicts an exemplary implementation of the method of the present invention in a tablet computer based AR application and the associated exemplary user interaction.

FIG. 6A depicts an exemplary implementation of the present invention in a tablet computer-based AR application. It is understood that a 2D image of an observed scene, 301, has been processes through the method of the preferred embodiment of the present invention, in which the image has been evaluated by the depth-CNN and camera parameters were supplied based on the tablet model such that the source image sensor's pose estimate has been ascertained relative to the scene and a depth map created for the scene and output to the AR software application to be used for AR visualization. In addition, the floor plane 305 has been recognized by the floor plane detection CNN, which was encoded into the output pose estimate vector, allowing the AR software application to use the plane as a reference for landing the base of a 3D virtual model of table, 302, that has been overlaid onto the image. Arrow, 304, is showing the user, 303, intension to relocate (drag) the table model to the center of the room.

Figure 6B:
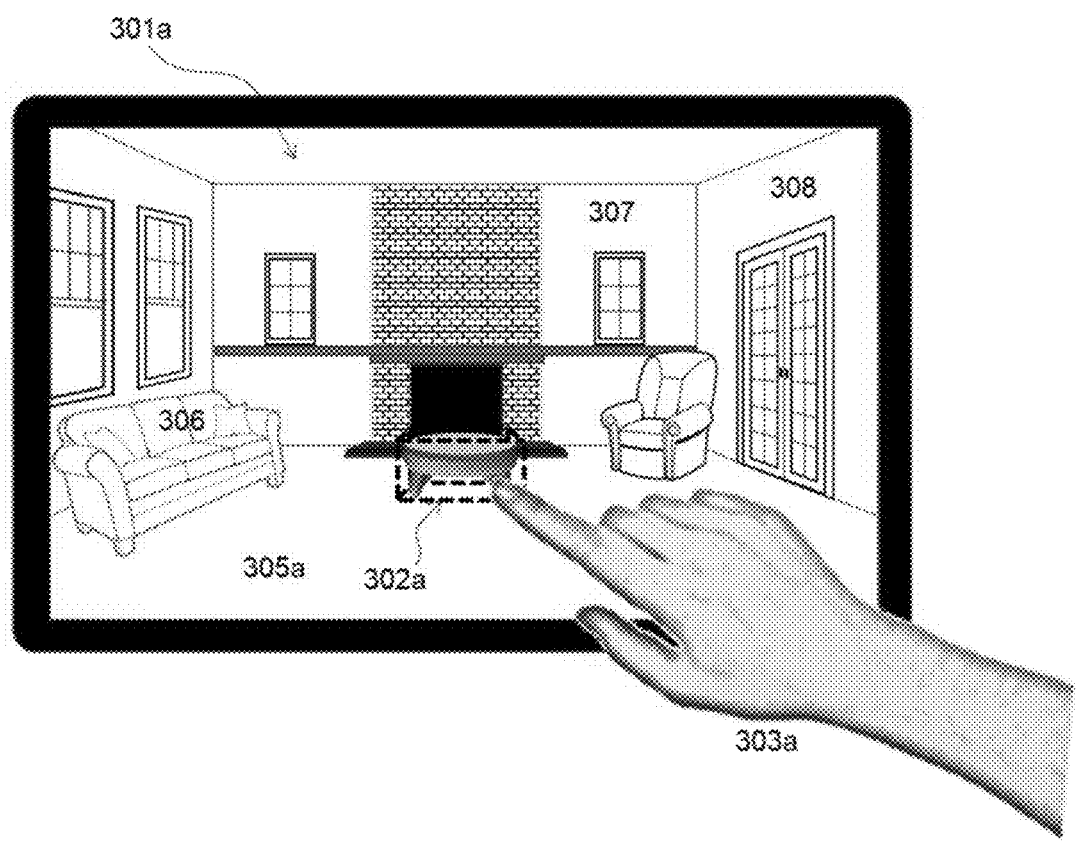
FIG. 6B is a continuation of FIG. 6A.

FIG. 6B shows the execution and result of the user's intention in FIG. 6A. As the user dragged the table model, 302a, to its new position, the scale of the model decreased proportionately, and the rotational perspective of the model was slightly adjusted, based on the known imaging sensor pose estimate. Also, the table model was translated such that it appeared to slide across the plane of the floor 305a in the image, providing a sense of realism to the embedded virtual image in the scene. Optionally, the scene image 301a could be processed through a method of the present invention utilizing wall plane detection CNN to detect and determine pose estimates, for example, for walls 307 and 308, which terminate at the intersection with floor plane 305a. Additionally, scene image 301a could further employ an exemplary sofa object detection, to detect sofa 306. With the known location and orientation of sofa 306, an appropriate 3D occlusion and object collision map may be overlaid on image 301a, providing limits for the translation of table 302a within the image and also revealing that the space between sofa 306 and 307, which is bounded below by floor plane 305a, is an empty space into which the table may be translated, albeit partially occluded by the sofa.

It is to be understood that the above referenced methods may be implemented on a non-transitory machine-readable storage medium comprising a plurality of instructions that, in response to being executed on a computing device, cause the computing device to complete the method steps in the orders disclosed for each respective embodiment.

As one having ordinary skill in the art will appreciate, the above referenced methods are applicable to any image comprising any content in a variety of formats to include, but not limited to interior spaces, landscapes, architectural renderings, Computer Aided Design (CAD) renderings, consumer products, surveillance video screen captures, or any other item that may be captured in a two dimensional image.

It should be further understood that various changes and modifications to the embodiments disclosed herein will be apparent to those skilled in the art. Such changes and modifications can be made without departing from the spirit and scope of the present disclosure and without diminishing its intended advantages.

What is claimed:

1. A computer-operated method of determining an angular field of view and estimating a pose of a source imaging sensor based on at least one two-dimensional (2D) image input comprising a plurality of image pixels of an observed scene, the method comprising:
   (a) accessing an input data set comprising a 2D image data set to be analyzed and source imaging sensor parameter information, (b) executing a Machine Learning algorithm that uses said 2D image data set of the input data set to generate estimated depth values for at least a portion of image pixels output by the source imaging sensor to provide real three-dimensional (3D) image points having associated depth values,
   (c) in parallel with executing the Machine Learning algorithm, determining an angular field of view of the source imaging sensor based on the input data set and generating a the source imaging sensor angular field of view as output,
   (d) in response to the real 3D image points including the generated estimated depth values and the generated angular field of view, generating a source imaging sensor (3D) pose estimate relative to the real 3D image points in the observed scene, and
   (e) outputting the generated 3D pose estimate in conjunction with the estimated depth values.

2. The method of claim 1, wherein the Machine Learning algorithm comprises an Artificial Neural Network (ANN).

3. The method of claim 1, wherein generating the 3D pose estimate comprises generating a vector with spherical coordinates.

4. The method of claim 1, further comprising performing a secondary Machine Learning algorithm, executed directly before, directly after, or in parallel with (b) and (c), wherein the secondary Machine Learning algorithm is trained to recognize a floor plane in a scene image, wherein performing the secondary Machine Learning algorithm receives an input scene image data set, and segments and classifies a floor plane object within the scene image and subsequently issues a matching pixel set as output.

5. The method of claim 4, wherein performing the secondary Machine Learning algorithm includes (i) receiving floor plane pixel values, (ii) determining associated depth estimates for said received pixel values, and (iii) using trigonometry or another suitable mathematical method to calculate location and orientation of a floor plane relative to the imaging sensor.

6. The method of claim 5, wherein performing the secondary Machine Learning algorithm includes encoding the calculated location and orientation of the floor plane as relative 3D location and orientation measurements, respectively, into an output imaging sensor pose estimate vector in the form of additional vector components.

7. The method of claim 1, further comprising performing an arbitrary number of additional Machine Learning algorithms, executed directly before, directly after, or in parallel with (b) and (c), or with each other, wherein an arbitrary one of the Machine Learning algorithm(s) has been trained to recognize an arbitrary object in a scene image, and upon receiving an input scene image data set, is capable of segmenting and classifying said object within the scene image and subsequently issuing the matching pixel set as output.

8. The method of claim 7, wherein (c) further encodes relative 3D location and orientation measurements of each detectable object into an output imaging sensor pose estimate vector in the form of additional vector components.

9. The method of claim 2, wherein the ANN comprises a Convolutional Neural Network (CNN).

10. The method of claim 1 further including training the Machine Learning algorithm using supervised training.

11. The method of claim 1, wherein a training data set for the Machine Learning algorithm comprises a plurality of image data set pairs, a 2D image of the observed scene and a 3D image of the same scene.

12. The method of claim 7, further including storing and transmitting additional semantic context definitions of objects in conjunction with pose estimate vector outputs of a respective object detection Machine Learning algorithm.

13. The method of claim 4, wherein (c) includes performing an additional calculation to create a file containing all pixels not coincident with a detected floor plane.

14. The method of claim 7, further including training the Machine Learning algorithm to detect wall plane objects.

15. The method of claim 7, further including training the Machine Learning algorithm to detect pendulous objects.

16. A computer-operated system for determining an angular field of view and estimating a three-dimensional (3D) pose of a source imaging sensor, comprising at least one processor configured to perform operations comprising:
  (a) receiving, based on image capture by a source imaging sensor, a two-dimensional (2D) input image data set comprising image pixels,
  (b) determining an angular field of view of the source imaging sensor based on the 2D input image data set,
  (c) using a Machine Learning algorithm that analyzes the 2D input image data set, estimating depth values for at least some of the image pixels to provide real 3D image points, and
  (d) in response to the determined angular field of view and the real 3D image points including the estimated depth values, estimating a 3D pose of the source imaging sensor relative to the real 3D image points.

17. The system of claim 16 wherein the 3D pose comprises a vector with spherical coordinates.

18. The system of claim 16 wherein the at least one processor is further configured to encode relative 3D location and orientation measurements of at least one detectable object into an output imaging sensor pose estimate vector in the form of additional vector components.

19. The system of claim 16 wherein the at least one processor is further configured to manipulate additional semantic context definitions of objects in conjunction with pose estimate vector outputs.

20. The system of claim 16 wherein the at least one processor is further configured to detect wall plane, floor plane and pendulous objects.

* * * * *